US012137503B2

United States Patent
Hariharan et al.

(10) Patent No.: US 12,137,503 B2
(45) Date of Patent: Nov. 5, 2024

(54) SYSTEMS AND METHODS FOR IMPROVING TRANSIENT RESPONSE IN SLEW-RATE LIMITED H-BRIDGE BUCK-BOOST DRIVERS

(71) Applicant: Maxim Integrated Products, Inc., San Jose, CA (US)

(72) Inventors: Suresh Hariharan, Livermore, CA (US); Ron Vincent Ocampo, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 18/134,459

(22) Filed: Apr. 13, 2023

(65) Prior Publication Data

US 2023/0344340 A1 Oct. 26, 2023

Related U.S. Application Data

(63) Continuation of application No. 18/131,407, filed on Apr. 6, 2023.

(Continued)

(51) Int. Cl.
*H05B 45/37* (2020.01)
*H02M 1/00* (2006.01)
(Continued)

(52) U.S. Cl.
CPC ........ *H05B 45/375* (2020.01); *H02M 1/0009* (2021.05); *H02M 1/0012* (2021.05);
(Continued)

(58) Field of Classification Search
CPC ...... H05B 45/37; H05B 45/39; H05B 45/375; H05B 45/395; H05B 45/3725;
(Continued)

(56) References Cited

U.S. PATENT DOCUMENTS 5,731,694 A * 3/1998 Wilcox ................. H02M 3/156
323/283
7,898,235 B2 * 3/2011 Seo ....................... H02M 3/156
323/284

(Continued)

FOREIGN PATENT DOCUMENTS

DE 102015103293 A1 9/2015

OTHER PUBLICATIONS

German office action mailed Feb. 19, 2024 in related German patent application No. 102023109911.6, (12 pgs).

(Continued)

*Primary Examiner* — Tung X Le
(74) *Attorney, Agent, or Firm* — North Weber & Raugh; Michael North

(57) ABSTRACT

Presented are average current mode control systems and methods for driving a load with a constant current. In embodiments, this is accomplished when, in response to a zero-current detection circuit detecting a zero current condition in the load current, a compensation circuit is disconnected from a first error amplifier to enable that error amplifier to provide a first voltage to a second error amplifier. The second error amplifier increases a charging current in a capacitor to reduce a dead time in the load current. Similarly, in response to an overcurrent detection circuit detecting an overcurrent condition in the load current, the compensation circuit is disconnected from the first error amplifier to enable the first error amplifier to provide a second voltage to the second error amplifier to decrease the charging current and reduce an overshoot condition.

20 Claims, 10 Drawing Sheets

Related U.S. Application Data

(60) Provisional application No. 63/332,899, filed on Apr. 20, 2022, provisional application No. 63/413,541, filed on Oct. 5, 2022, provisional application No. 63/441,377, filed on Jan. 26, 2023.

(51) Int. Cl.
- *H02M 1/08* (2006.01)
- *H02M 1/32* (2007.01)
- *H02M 3/158* (2006.01)
- *H05B 45/36* (2020.01)
- *H05B 45/3725* (2020.01)
- *H05B 45/375* (2020.01)
- *H05B 45/38* (2020.01)

(52) U.S. Cl.
CPC ......... *H02M 1/0058* (2021.05); *H02M 1/083* (2013.01); *H02M 1/32* (2013.01); *H02M 3/158* (2013.01); *H02M 3/1582* (2013.01); *H05B 45/36* (2020.01); *H05B 45/3725* (2020.01); *H05B 45/38* (2020.01)

(58) Field of Classification Search
CPC .. H02M 1/0009; H02M 1/0058; H02M 1/083; H02M 1/32; H02M 3/158
See application file for complete search history.

(56) References Cited

U.S. PATENT DOCUMENTS

| | | |
|---|---|---|
| 8,975,831 B1 | 3/2015 | Szoulusha et al. |
| 10,149,356 B2 * | 12/2018 | Tanaka .................. H05B 45/38 |
| 10,562,438 B2 | 2/2020 | Katsura et al. |
| 11,219,107 B2 | 1/2022 | Dorai et al. |
| 2008/0203946 A1 | 8/2008 | Ito et al. |
| 2012/0139428 A1 | 6/2012 | Grebner et al. |
| 2015/0208476 A1 | 7/2015 | Mramatsu et al. |
| 2015/0256071 A1 * | 9/2015 | Penzo .................. H05B 45/48 315/297 |
| 2017/0325296 A1 | 11/2017 | Saes et al. |
| 2021/0392730 A1 * | 12/2021 | Galvano ................... F21S 4/26 |
| 2022/0102969 A1 * | 3/2022 | Aoki ..................... H02H 3/087 |

OTHER PUBLICATIONS

Response to German office action filed Apr. 15, 2024 in related German patent application No. 102023109911.6, (2 pgs).
Ex Parte Quayle action mailed Sep. 11, 2024 in related U.S. Appl. No. 18/131,407, (12 pgs).
Response to Ex Parte Quayle action filed Sep. 23, 2024 in related U.S. Appl. No. 18/131,407, (9 pgs).

* cited by examiner

SYSTEMS AND METHODS FOR IMPROVING TRANSIENT RESPONSE IN SLEW-RATE LIMITED H-BRIDGE BUCK-BOOST DRIVERS

CROSS REFERENCE TO RELATED PATENT APPLICATIONS

The present application is a connation of and claims priority benefit, under 35 U.S.C. § 120, to commonly-assigned U.S. patent application Ser. No. 18/131,407, filed on Apr. 6, 2023, entitled "Systems and Methods for Improving Transient Response in H-Bridge Buck-Boost Drivers Using Integrated Matrix Manager," which claims priority to U.S. Provisional Patent Application No. 63/332,899, filed on Apr. 20, 2022, entitled "Systems and Methods for Improving Transient Response in Slew-Rate Limited H-Bridge Buck-Boost Drivers," to U.S. Provisional Patent Application No. 63/413,541, filed on Oct. 5, 2022, entitled "Systems and Methods for Improving Transient Response H-Bridge Buck-Boost Drivers," and to U.S. Provisional Patent Application No. 63/441,377, filed on Jan. 26, 2023, entitled "Systems and Methods for Improving Transient Response H-Bridge Buck-Boost Drivers Using Integrated Matrix Manager," each document listing as inventors Suresh Hariharan and Ron Vincent Ocampo. The disclosures of all of the foregoing applications are incorporated herein in their entirety by reference and for all purposes.

BACKGROUND

A. Technical Field

The present disclosure relates generally to systems and methods for current and voltage regulators. More particularly, the present disclosure relates to systems and methods for improving transient response in H-bridge buck-boost driver applications, such as Light-Emitting-Diode (LED) applications.

B. Background

Adaptive driving beam (ADB) headlamps are quickly becoming prevalent in automotive applications. Generally, an ADB circuit uses an LED driver that supplies a regulated current to an array of LEDs to generate light. A matrix manger places shunting switches in parallel with each of the LEDs to turn the LEDs on or off to control a desired light output. One side-effect of switching operations that increase and decrease over time the number of LEDs that are turned on in a string of LEDs is the introduction undesirable transient responses in the output current that exhibits dead times and, thus, negatively impacts LED brightness. In comparison, an ideal LED driver would maintain a constant output current irrespective of the varying string voltage.

Accordingly, it is desirable to have systems and methods for various applications, including modern LED driver circuits, which overcome the deficiencies of existing designs and improve a circuit's slew-rate limited transient response, ideally, without negatively impacting other circuit parameters.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
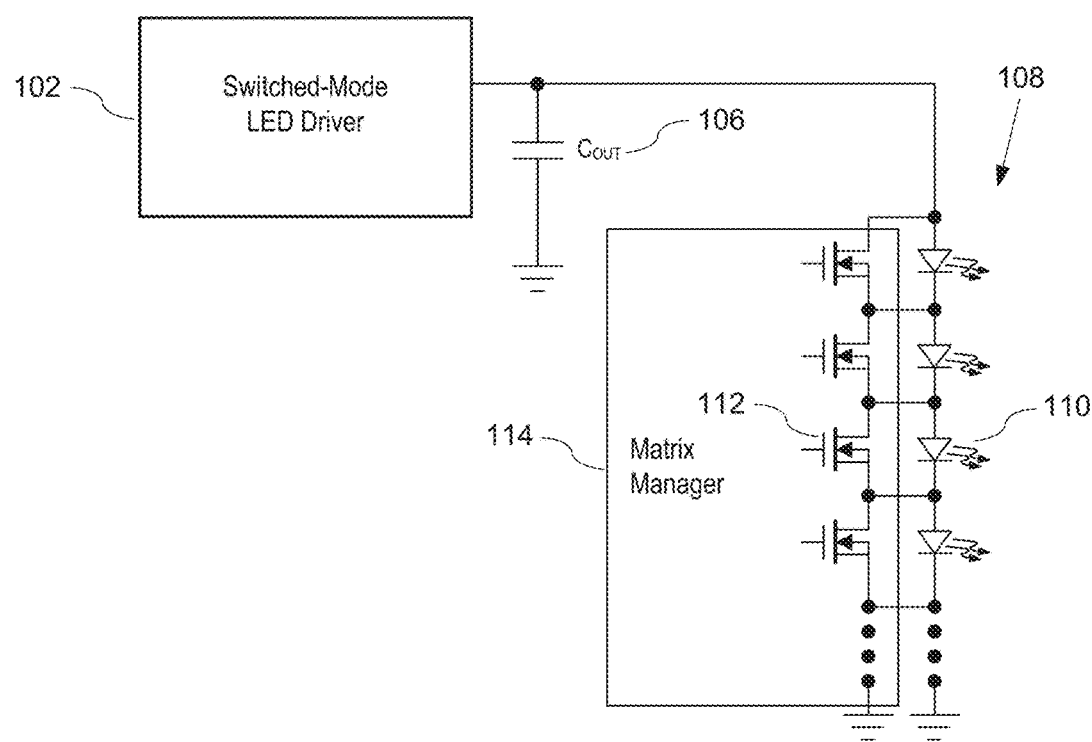
FIG. 1 is a simplified circuit diagram of an LED driver system that utilizes a switched-mode LED driver.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component, e.g., a monolithic IC. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

It shall be noted that embodiments described herein are discussed in the context of LED driver circuits, but one skilled in the art shall recognize that the teachings of the present disclosure are not limited to any specific driver circuit, voltage or current regulators, or LED applications and may equally be used in other contexts and to drive non-LED loads.

In this document the terms "regulator" and "converter," and the terms "LED string" and "LED array," are used interchangeably. Similarly, the terms "matrix manager" and "matrix control circuit" are used interchangeably. "Control circuit" comprises microcontrollers, logic elements, amplifiers, comparators, and any other control elements recognized by one of skilled in the art.

FIG. 1 is a simplified circuit diagram of an LED driver system that utilizes a switched-mode LED driver. LED driver system 100 comprises switch-mode LED driver 102 that drives LED string 108. As depicted in FIG. 1, LED string 108 comprises a number of LEDs (e.g., 110) that each is controlled by a MOSFET device that acts as a switch (e.g., 112) that is controlled by matrix manager 504.

Output capacitor 106 in LED driver circuit 100 typically has a larger capacitance value than the capacitance value that would be needed for a simple buck LED driver. However, in operation, a larger capacitor causes an increase in dead time, e.g., when LED driver 102 switches from driving a relatively low number of LEDs (e.g., 110) to driving a relatively higher number of LEDs. During the dead time, there is no light output by LED string 108 since output capacitor 106 is being charged to the new target LED string forward voltage required to regulate to the desired load current. In addition, the resulting transient effect causes the time averaged LED current in LED driver circuit 100 to drop slightly below the regulation point. As a result, the overall brightness produced by LED string 108 is slightly reduced.

Conversely, when LED driver 102 switches from driving a relatively high number of LEDs to driving a relatively low number of LEDs, the LED current experiences an overshoot condition in which the LED current exceeds a setpoint and remains in that condition for a relatively longer time, i.e., until the output capacitor discharges to the new LED string voltage. Neither scenario is desired since the additional dead time limits the minimum dimming duty cycle of LED string 108. Further, a prolonged current overshoot may physically damage some or all LEDs in LED string 108. These issues are exacerbated if multiple LEDs are switched simultaneously. It is desirable to have low-cost systems LED driver systems and corresponding methods that allow reduce dead time and maintain a continuous inductor current in ADB and similar applications.

Figure 2:
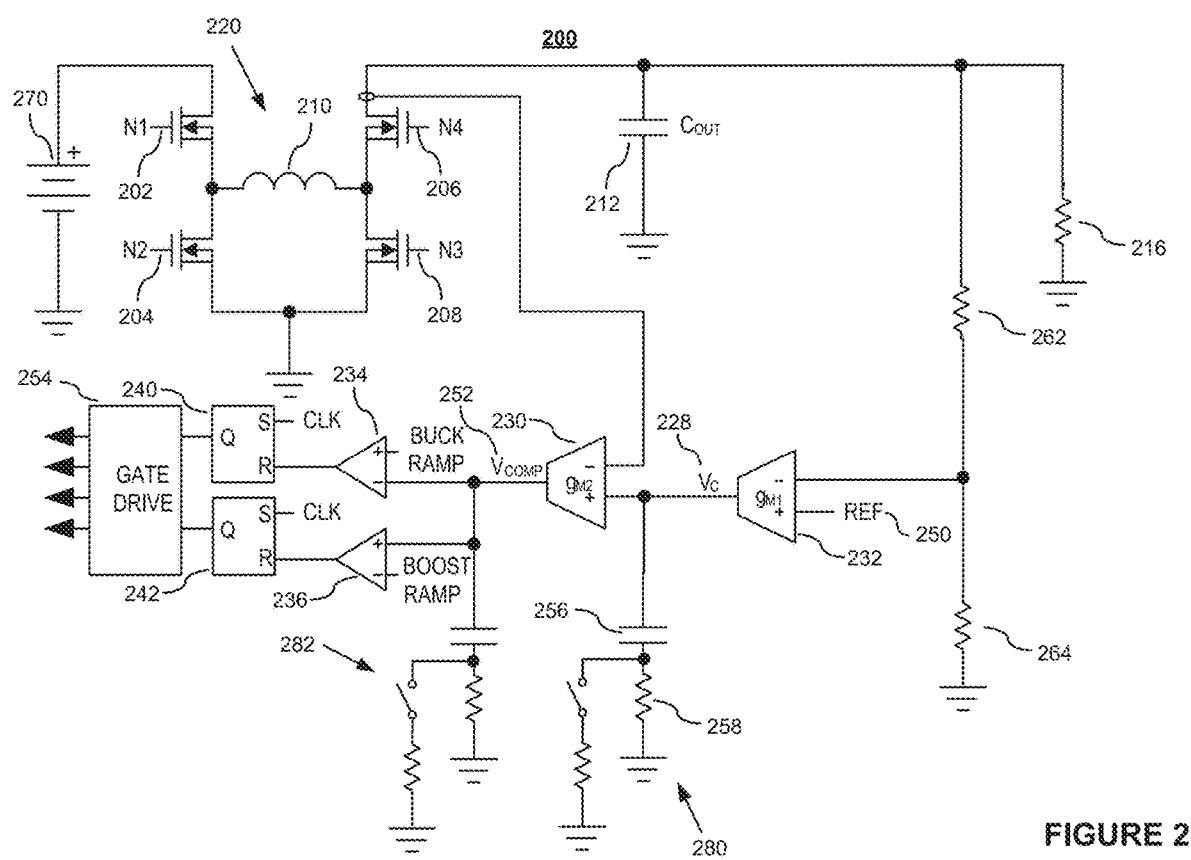
FIG. 2 illustrates an exemplary DC/DC converter circuit that utilizes average current mode control and a variable compensation circuit, according to various embodiments of the present disclosure.

FIG. 2 illustrates an exemplary DC/DC converter circuit that utilizes average current mode control and a variable compensation circuit, according to various embodiments of the present disclosure. In embodiments, DC/DC converter 200 comprises H-bridge 220 that is energized by power source 270 and comprises switches 202-208 and inductor 210. As depicted in FIG. 2, DC/DC converter 200 may drive a purely resistive load 216, error amplifiers 230-232, comparators 234-236, clock-based logic circuitry 240-242, gate driver 254, and RC compensation networks 280, 282, which comprise various switches, resistors (e.g., 258), and capacitors (e.g., 256).

In embodiments, converter circuit 200 may comprise two feedback loops, as depicted in FIG. 2. A first loop ("inner loop") may comprise switch 206, error amplifier 230, comparators 234-236, e.g., a pair of PWM comparators, logic circuitry 240-242, and gate driver 254. A second loop ("outer loop") may comprise switch 202, resistor 262, error amplifiers 230-232, comparators 234-236, logic circuitry 240-242, and gate driver 254. As depicted, the output of error amplifier 232 may be used to control the input of error amplifier 230.

In embodiments, once load 216 conducts a current, inner loop amplifier 230 may generate error voltage 252, denoted VCOMP, between the outer loop and the sensed current that flows through switch 206. Obtained error voltage 252 may be input to the pair of PWM comparators 234-236, which may set the duty cycle of one or more of switches 202-208 of H-bridge 220 to regulate an average current through switch 206. In embodiments, since switch 206 is coupled in series with load 216, the feedback arrangement in FIG. 2 may use the average current flowing through switch 206 to adjust the duty cycle of switches 202-208 such that the output voltage is regulated to a value determined by reference 250 and a voltage divider formed by resistors 262-264. For example, at steady state, the average current flowing through switch 206 may be substantially equal to the current flowing through load 216.

In embodiments, in regular buck mode, converter circuit 200 may have, e.g., an input voltage of 12 V and an output voltage of 7 V. In scenarios where the input voltage drops below 7 V, H-bridge circuit 220 will enter a boost mode regulation to properly maintain the output voltage. Due to the right half-plane zero limiting the crossover frequency (e.g., to 20 kHz), component values for compensation circuits 280, 282 are typically selected such that compensation circuits 280, 282 can accommodate the "worst case" boost mode.

Advantageously, this not only avoids circuit instabilities in the boost mode, but also provides circuit stability in buck mode operation. As the person of skill in the art will recognize, this approach does not necessarily ensure that the best possible bandwidth is always achieved in both types of mode. Especially in the buck mode, to keep the unity gain lower than 1/10th of the switching frequency, e.g., 400 kHz, it is preferable that the crossover frequency does not exceed, e.g., 40 kHz. However, the presence of right half-plane zero in boost mode may force the boost mode crossover frequency to be, e.g., ⅕ of the right half plane zero frequency of, e.g., 20 kHz, (i.e., 4 kHz), thereby, causing a significant amount of bandwidth of 36 kHz to be sacrificed during buck mode operation. Therefore, it would be desirable to have solutions that allow satisfactory and stable circuit performance in all modes of operation, ideally, without having to sacrifice bandwidth or negatively impacting any other circuit parameters, irrespective of the mode converter circuit 200 operated in at any given moment.

In particular, it is desirable to have systems and methods in which compensation networks 280, 282 of converter circuit 200 may be independently adjusted for different modes of operation, such that, rather than being limited to a design that is tailored to safeguard only against instabilities that may be caused by the worst-case boost mode scenario, maximum bandwidth and, hence, the fastest transient response may be individually selected for the different modes. In this manner, all modes and regions of operation may take advantage of increased circuit performance.

In various embodiments herein, this may be achieved, e.g., by modifying compensation networks 280, 282 of error amplifiers 230-232, e.g., by adding one or more switches such that the feedback loop may use various compensation values that can be switched-in and out (i.e., adjusted) depending on circuit conditions and mode(s) of operation, thus, avoiding suboptimal circuit performance in one mode in favor of improved circuit performance in another mode.

In detail, switchable compensation networks 280, 282 may be made adjustable according to the mode of operation and the specific application, e.g., to increase a crossover frequency in each respective mode of operation. In embodiments, in response to DC/DC converter 200 detecting the state in which the H-bridge 220 currently operates, e.g., whether the H-bridge operates in buck mode or in boost mode, compensation network 280, 282 may be adjusted to archive a desired operating condition in that mode while maintaining a satisfactory bandwidth for that mode of operation. As a result, while an optimal bandwidth in boost mode would not necessarily serve as the optimal bandwidth in buck mode, an optimal bandwidth in buck mode may be used without the rendering the boost case instable.

In embodiments, DC/DC converter 200 may obtain information about a state of H-bridge 220 from any controller or logic circuit that may be internal or external to circuit 200. In embodiments, the controller may, for example, compare the ratio of the input and output voltages to determine the state.

It is understood that, in embodiments, a desired application-specific operating condition for a given state or mode may be determined prior to determining proper component values for compensation networks 280, 282. For example, in embodiments, a maximum boosting condition, e.g., as defined by the lowest input voltage and the highest output voltage, may be used to select appropriate values for compensation circuits 280, 282, an effective load resistance, and an output capacitor value that define a boost load pole and a lowest crossover frequency for circuit 200. Once the right half-plane zero has been determined, e.g., by using the effective load resistance, inductor 210, and the duty cycle, the feedback compensation may be designed such that the compensating zero is at approximately at the same frequency as the boost load pole and the unity gain frequency is less than, e.g., ⅕ of the right half plane zero.

Similarly, a maximum bucking condition, e.g., defined by the highest input voltage and the lowest output voltage, may be used to select appropriate values for compensation circuits 280, 282, an effective load resistance, and an output capacitor value that define a buck load pole and the highest crossover frequency for circuit 200. In embodiments, the feedback compensation may be designed such that the compensating zero is at approximately at the same frequency as the buck load pole, and the unity gain frequency is less than, e.g., ⅕-1/10 of the switching frequency.

In embodiments, once converter circuit 200 determines a mode of operation for H-bridge 220, converter circuit 200 may toggle between, e.g., two pre-selected compensation settings in a manner such that, advantageously, the compensation setting for the buck mode is not limited by right half plane zero in the boost mode.

Figure 3:
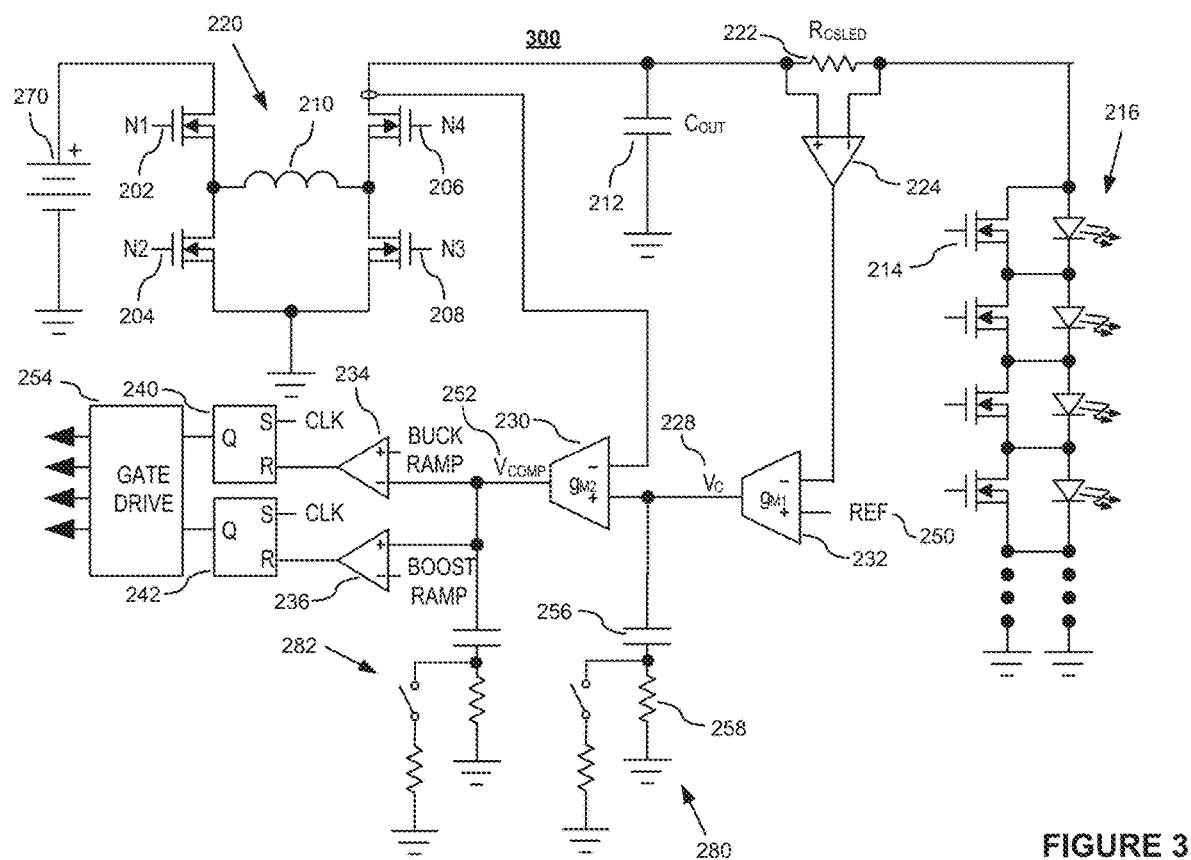
FIG. 3 illustrates an exemplary H-bridge buck-boost LED driver circuit that utilizes average current mode control and variable compensation circuit, according to various embodiments of the present disclosure.

FIG. 3 illustrates an exemplary H-bridge buck-boost LED driver circuit that utilizes average current mode control and variable compensation circuit, according to various embodiments of the present disclosure. In embodiments, H-bridge buck-boost LED driver circuit 300 comprises H-bridge 220. For clarity, components similar to those shown in FIG. 2 are labeled in the same manner. For purposes of brevity, a description or their function is not repeated here.

As depicted in the topology in FIG. 3, H-bridge buck-boost LED driver circuit 300 comprises LED string 216, which comprises LEDs that each may be connected in parallel with a shunting switch (e.g., 214).

As depicted in FIG. 3, in embodiments, the inner loop may comprise switch 206, error amplifier 230, comparators 234-236, e.g., a pair of PWM comparators, logic circuitry 240-242, and gate driver 254. The outer loop may comprise switch 202, resistor 222, current sense amplifier 224, error amplifiers 230-232, comparators 234-236, logic circuitry 240-242, and gate driver 254.

In embodiments, current sense amplifier 224 and error amplifier 232 in the outer loop may be used to set a desired current through LED string 216, e.g., as determined by reference voltage 250, which may be user-programmable. As depicted, the output of error amplifier 232 may be used to control the input of error amplifier 230.

Similar to the circuit in FIG. 2, in embodiments, once H-bridge buck-boost LED driver circuit 300 determines a mode of operation for H-bridge 220, driver circuit 300 may toggle between a number of predetermined compensation settings such that the compensation setting for buck mode is not limited by the boost mode's right half plane zero.

Figure 4:
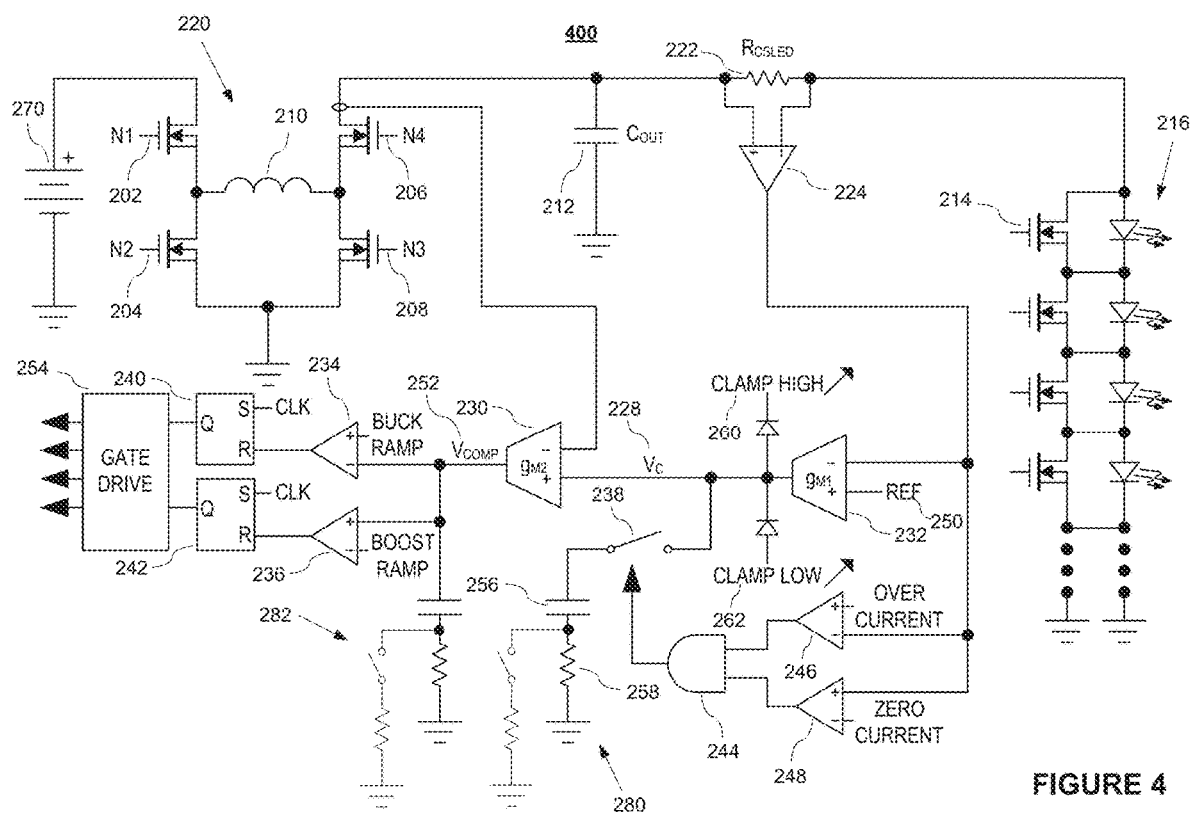
FIG. 4 illustrates an H-bridge buck-boost converter circuit that utilizes average current mode control, according to various embodiments of the present disclosure.

FIG. 4 illustrates an H-bridge buck-boost converter circuit that utilizes average current mode control, according to various embodiments of the present disclosure. In embodiments, H-bridge buck-boost LED driver circuit 400 comprises H-bridge 220. As depicted in the topology in FIG. 4, H-bridge 220 is energized by power source 270 and comprises switches 202-208 and inductor 210. H-bridge buck-boost LED driver circuit 400 further comprises LED string 216, which comprises LEDs that each may be connected in parallel with a shunting switch (e.g., 214), output capacitor 212, which is coupled to a ground potential, current sense amplifier 224, error amplifiers 230-232, comparators 234-236 and 246-248, clock-based logic circuitry 240-242, gate driver 254, logic device 244, switch 238, and RC compensation network 282, which comprises resistor 258 and capacitor 256.

In embodiments, the inner loop may comprise switch 206, error amplifier 230, comparators 234-236, e.g., a pair of PWM comparators, logic circuitry 240-242, and gate driver 254. The outer loop may comprise switch 202, resistor 222, current sense amplifier 224, error amplifiers 230-232, comparators 234-236, logic circuitry 240-242, and gate driver 254.

In embodiments, current sense amplifier 224 and error amplifier 232 in the outer loop may be used to set a desired current through LED string 216, e.g., as determined by reference voltage 250, which may be user-programmable. As depicted, the output of error amplifier 232 may be used to control the input of error amplifier 230. As depicted in FIG. 4, switch 238 is coupled between error amplifier 232 and outer loop RC compensation network 282. Switch 238 is further coupled to assume programmable high clamp voltage and low clamp voltage levels at the output of error amplifier 232. In operation, the clamp voltage may be adjusted, e.g., according to reference voltage 250 present at the noninverting input of error amplifier 232.

In embodiments, once LEDs in string 216 conduct a current, inner loop amplifier 230 may generate error voltage 252, denoted VCOMP, between the outer loop and the sensed current that flows through switch 206. Obtained error voltage 252 may be input to the pair of PWM comparators 234-236, which may set the duty cycle of one or more of switches 202-208 of H-bridge 220 to regulate an average current through switch 206. In embodiments, since switch 206 is coupled in series with LED string 216, the feedback arrangement in FIG. 4 may adjust the average current flowing through switch 206 and the current flowing through LED string 216 to have substantially the same value. For example, at steady state, the average current flowing through switch 206 may be substantially equal to the current flowing through LED string 216.

In embodiments, a change in load conditions, e.g., caused by an LED driver circuit switching from driving an LED string having a relatively low number of LEDs to driving a higher number of LEDs, may cause the LED current to drop essentially to a 0 A value. This drop, in turn, will cause zero current comparator 248 to output a signal that, in embodiments, may be used to disconnect switch 238 from voltage node 228. As a result, the voltage, VC, at node 228 may be pulled up and rise to high clamp voltage 260. It is noted that this is in stark contrast to the typical behavior of a conventional feedback loop, which would react to the LED current drop by operating in a slew-rate limited region and linearly increasing the error voltage based on the on the RC compensation network and the maximum available current output by the error amplifier. The step function-like rise in the voltage at node 228 may be thought of as caused by a temporary disconnecting of the outer loop that forces a programmed average current through switch 206 to increase to a relatively higher level, thereby, increasing the amount of current available to charge output capacitor 212. This charging, in turn, decreases the dead time, e.g., until LED string 216 reaches a new target forward string voltage associated with the number of LEDs turned on in LED string 216. Once LED string 216 resumes conducting an LED current, the signal output by sense amplifier 224 may cause switch 238 to close, thereby, returning the control of the average current to the closed feedback loop topology.

Average current mode control systems and methods herein advantageously maintain the DC regulation point of the voltage at node 228 for a fixed LED current regardless of input or output voltages. For example, opening switch 238 retains the desired voltage value across RC compensation network 280. As an additional benefit, once switch 238 is closed, the voltage at node 228 may immediately return to its previous regulation point prior to switch 238 being opened to assume its pre-transient value.

In embodiments, a change in load conditions caused by an LED driver circuit switching from driving an LED string having a relatively high number of LEDs to driving a lower number of LEDs, may cause the LED current, instead of exhibiting a dead time, to exhibit a current overshoot behavior. The overshoot will cause the feedback loop to behave in a similar manner as before only in the opposite direction. In particular, the overshoot is associated with the output voltage of capacitor 212 being initially too high for the number of LEDs that are turned on. Thus, it is desirable to lower the average current flowing through switch 206 to prevent having excess charge flowing through LED string 216 and capacitor 212 while capacitor 212 is in the process of discharging to a lower LED string voltage. In embodiments, in an overshoot scenario, overcurrent comparator 246 may output a signal that may be used to disconnect switch 238 from voltage node 228 such that the voltage VC is pulled down to low clamp voltage 262. Once the overshoot condition subsides, switch 238 may be closed, the voltage at node 228 may return to its previous regulation point, and the closed feedback loop may regain control of LED driver circuit 400.

Figure 5:
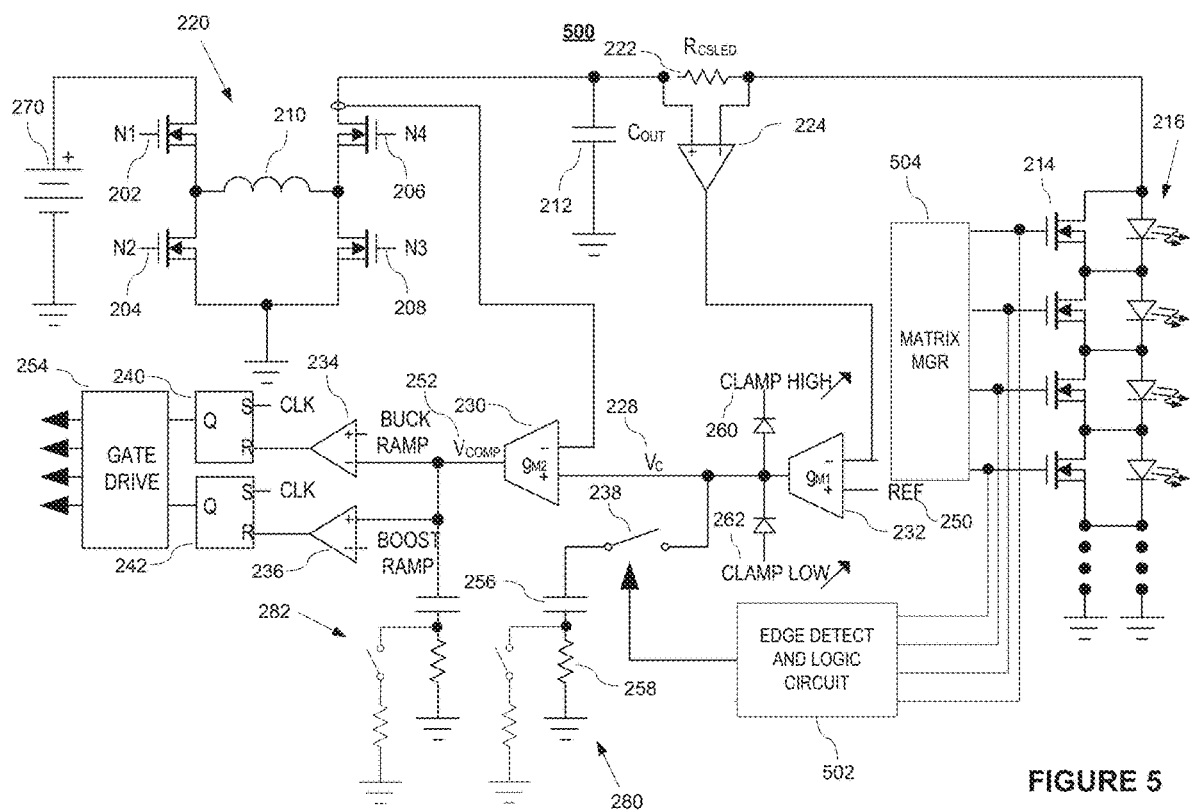
FIG. 5 illustrates an exemplary H-bridge buck-boost converter circuit that utilizes a detection circuit, according to various embodiments of the present disclosure.

FIG. 5 illustrates an exemplary H-bridge buck-boost LED driver circuit that utilizes average current mode control, according to various embodiments of the present disclosure. In embodiments, H-bridge buck-boost LED driver circuit 500 comprises H-bridge 220. As depicted in the topology in FIG. 5, H-bridge 220 is energized by power source 270 and comprises switches 202-208 and inductor 210. H-bridge buck-boost LED driver circuit 500 further comprises LED string 216, which comprises LEDs that each may be connected in parallel with a shunting switch (e.g., 214), output capacitor 212, which is coupled to a ground potential, current sense amplifier 224, error amplifiers 230-232, comparators 234-236, clock-based logic circuitry 240-242, gate driver 254, edge detect and logic circuit 502, matrix manager 504, switch 238, and RC compensation network 282, which comprises resistor 258 and capacitor 256.

It is understood that edge detect and logic circuit 502 may be implemented as any control circuit known in the art and comprise, e.g., a logic decoder circuit. Similarly, matrix manager 504 may be implemented as any control circuit known in the art. Switch 238 may be implemented as any switch known in the art, including a FET or MOSFET device.

In embodiments, the inner loop in driver circuit 500 may comprise switch 206, error amplifier 230, comparators 234-236, e.g., a pair of PWM comparators, logic circuitry 240-242, and gate driver 254. And the outer loop may comprise at least one of switches 202-208 (e.g., 202), resistor 222, current sense amplifier 224, error amplifiers 230-232, comparators 234-236, logic circuitry 240-242, and gate driver 254.

In embodiments, current sense amplifier 224 and error amplifier 232 in the outer loop may be used to set a desired current through LED string 216, e.g., as determined by reference voltage 250, which may be user-programmable. As depicted, the output of error amplifier 232 may be used to control the input of error amplifier 230. As depicted in FIG. 5, switch 238 is coupled between error amplifier 232 and outer loop RC compensation network 282. Switch 238 is further coupled to assume programmable high clamp voltage and low clamp voltage levels at the output of error amplifier 232. In operation, the clamp voltage may be adjusted, e.g., according to reference voltage 250 present at the noninverting input of error amplifier 232.

In embodiments, once LEDs in string 216 conduct a current, inner loop amplifier 230 may generate error voltage 252, denoted VCOMP, between the outer loop and the sensed current that flows through switch 206. Obtained error voltage 252 may be input to the pair of PWM comparators 234-236, which may set the duty cycle of one or more of switches 202-208 of H-bridge 220 to regulate an average current through switch 206. In embodiments, since switch 206 is coupled in series with LED string 216, the feedback arrangement in FIG. 5 may adjust the average current flowing through switch 206 and the current flowing through LED string 216 to have substantially the same value. For example, at steady state, the average current flowing through switch 206 may be substantially equal to the current flowing through LED string 216.

In embodiments, a change in load conditions, e.g., caused by matrix manager 504 controlling any of switches 214 to open, such as to transition from driving an LED string having a relatively low number of LEDs to driving a higher number of LEDs, may cause edge detect and logic circuit 502 to detect an edge. This, in turn, may cause edge detect and logic circuit 502 to output a signal or digital command, e.g., a digital signal that, in embodiments, may provide useful information to determine whether disconnect switch 238 from voltage node 228. As a result, the voltage, VC, at node 228 may be pulled up and rise to high clamp voltage 260. It is noted that this is in stark contrast to the typical behavior of a conventional feedback loop, which would react to the LED current drop by operating in a slew-rate limited region and linearly increasing the error voltage based on the on the RC compensation network and the maximum available current output by the error amplifier. The step function-like rise in the voltage at node 228 may be thought of as caused by a temporary disconnecting of the outer loop that forces a programmed average current through switch 206 to increase to a relatively higher level, thereby, increasing the amount of current available to charge output capacitor 212. This charging, in turn, decreases the dead time, e.g., until LED string 216 reaches a new target forward string voltage associated with the number of LEDs turned on in LED string 216. Once LED string 216 resumes conducting an LED current, the signal output by sense amplifier 224 may cause switch 238 to close, thereby, returning regulation of the average current to the closed feedback loop topology.

Average current mode control systems and methods herein advantageously maintain the DC regulation point of the voltage at node 228 for a fixed LED current regardless of input or output voltages. For example, opening switch 238 retains the desired voltage value across RC compensation network 280. As an additional benefit, once switch 238 is closed, the voltage at node 228 may immediately return to its previous regulation point prior to switch 238 being opened to assume its pre-transient value.

In embodiments, when matrix manger 504 causes any of switches 214 to close, thereby transitioning from driving an LED string having a relatively high number of LEDs to driving a lower number of LEDs, the LED current, instead of exhibiting a dead time, may exhibit a current overshoot behavior. The overshoot will cause the feedback loop to behave in a similar manner as before only in the opposite direction. In particular, the overshoot is associated with the output voltage of capacitor 212 being initially too high for the number of LEDs that are conducting current. Thus, it is desirable to lower the average current flowing through switch 206 to prevent having excess charge flowing through LED string 216 and capacitor 212 while capacitor 212 is in the process of discharging to a lower LED string voltage. In embodiments, in an overshoot scenario, edge detect and logic circuit 502 may output a signal that may be used to disconnect switch 238 from voltage node 228 such that the voltage VC is pulled down to low clamp voltage 262. Once the overshoot condition subsides, switch 238 may be closed, the voltage at node 228 may return to its previous regulation point, and the closed feedback loop may regain control of LED driver circuit 500.

As a person of skill in the art will understand, to achieve optimal performance, it would be beneficial if the feedback loop would a priori know that one or more of the LEDs are about to change their state, i.e., that they are about to turn on or off. In embodiments, when the LED driver and matrix manager 504 are implemented in separate integrated circuits, the feedback loop is used to perform some method to determine the new state that LED string 216 is changing to, e.g., based on an LED current overshoot or undershoot condition. One possible approach is to use a standalone matrix manger may pass information regarding the state of the switches to a standalone LED driver, e.g., via dedicated pins and/or an appropriate communication protocol. The LED current may be monitored and the voltage VC may be driven to a clamp high state once a current undershoot is present and, conversely, to a clamp low state when a current overshoot is present. This approach may introduce a lag between the time that the matrix switches (e.g., 214) open and close and the time that the feedback loop has to respond, thereby, negatively influencing performance.

Figure 6:
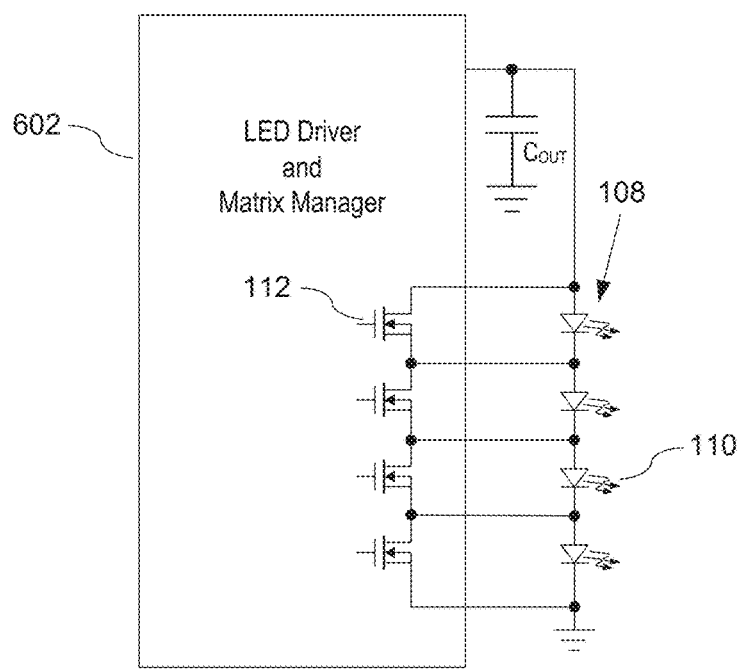
FIG. 6 illustrates an exemplary integrated circuit comprising an LED driver and matrix manager circuit, according to various embodiments of the present disclosure.

Therefore, unlike in existing applications where the LED drivers and matrix managers are implemented in separate integrated circuits, in embodiments herein, to further improve performance and reduce size, LED driver circuit 500 and matrix manager 504 may be implemented on the same integrated circuit, as illustrated in FIG. 6, as LED driver circuit and matrix manager 602, including the switches (e.g., 112) that control LED string 108. In addition to increasing performance, e.g., by reducing signal delays due to time lags, integrated embodiments may, advantageously, reduce the number of dedicated pins to communicate between two separate circuits or sub-circuits.

It is understood that the circuit topologies in FIG. 2 through FIG. 6 are not limited to the constructional detail shown therein or described in the accompanying text. For example, one skilled in the art will appreciate that resistors (e.g., resistor 258) may be implemented as a set of switchable parallel resistors that may be used to provide for a variable resistance value of RC compensation network 280, 282 that may be adjusted by control logic to a predetermined resistance value. Similarly, capacitors (e.g., capacitor 256) may be implemented as a bank of parallel variable capacitors. A person skilled in the art will further appreciate that switch 238 may be implemented as any switch known in the art, including a FET or MOSFET device, and the logic circuit 502 may be implemented as any control circuit known in the art. Compensation networks 280, 282 may be implemented as one or more dedicated compensation networks that may be separately controlled and operated. One skilled in the art will further appreciate that any number of elements described above may be physically and/or functionally separated into sub-modules or combined in various configurations.

Figure 7:
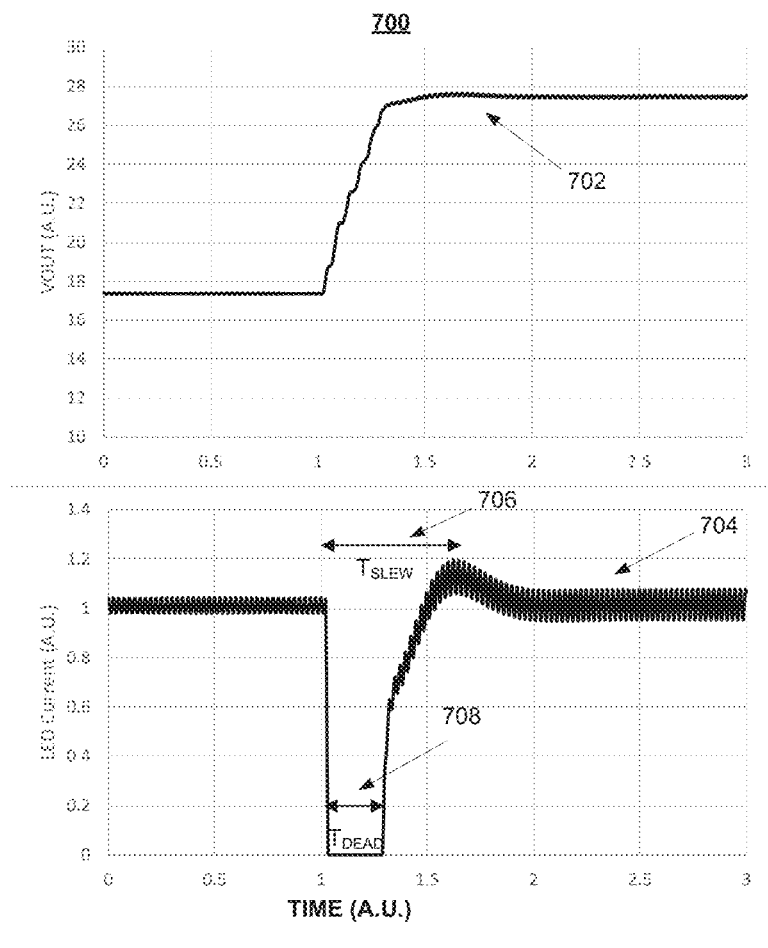
FIG. 7 depicts simulation results for a converter circuit, according to various embodiments of the present disclosure.

Experimental results demonstrate that systems and methods disclosed herein may achieve relatively short dead times. FIG. 7 depicts simulation results for a converter circuit, according to various embodiments of the present disclosure. It is noted that experimental results herein are provided by way of illustration and were performed under specific conditions using a specific embodiment or embodiments; accordingly, neither these experiments nor their results shall be used to limit the scope of the disclosure of the current patent document. Plot 700 demonstrates that a relatively short dead time (denoted as numeral 708) may be achieved using a circuit similar to that shown in FIG. 5. Advantageously, this result may be achieved while keeping LED current 704 substantially continuous at about 1 A when output voltage 702 varies drastically from about 17 V to 27 V.

Figure 8:
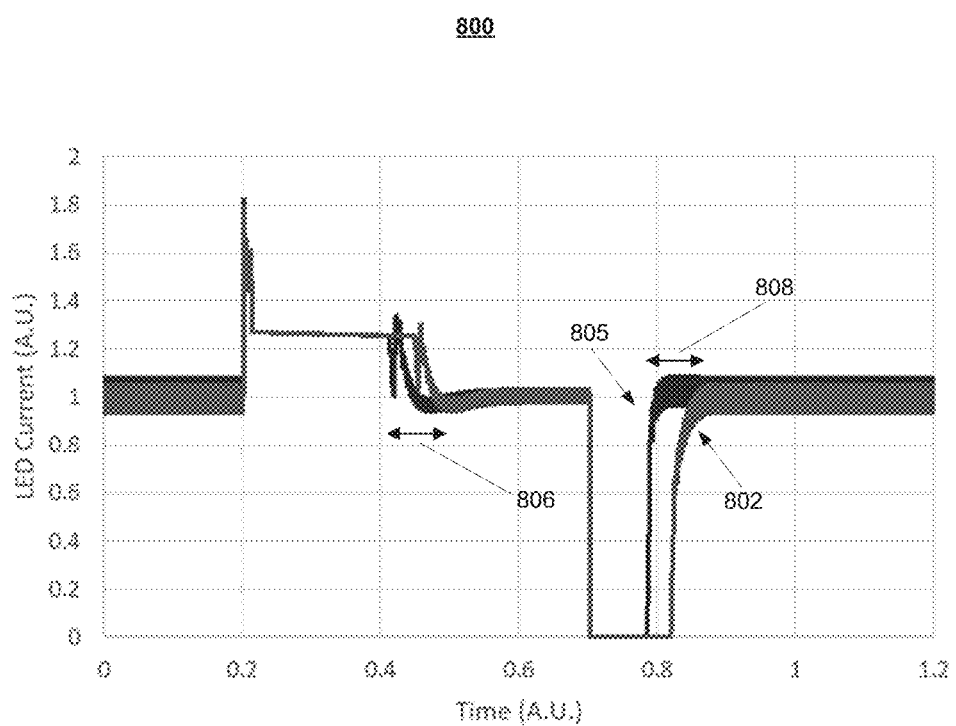
FIG. 8 is a comparison of experimental results that illustrates the effect of average current mode control as applied to a switched-mode LED driver circuit, according to various embodiments of the present disclosure.

FIG. 8 is a comparison of experimental results that illustrates the effect of average current mode control as applied to a switched-mode LED driver circuit, according to various embodiments of the present disclosure. Plot 802 in FIG. 8 depicts a result for a common circuit that does not utilize the teachings of the present disclosure, whereas plot 805 depicts a result for a circuit that does. As may be easily gleaned from FIG. 8, the reduction in dead time for plot 805 is significant. In FIG. 8, numeral 806 indicates an exemplary improvement associated with a low clamp voltage depicted as numeral 262 in FIG. 5. Conversely, numeral 808 indicates an exemplary improvement associated with a high clamp voltage depicted as numeral 260 in FIG. 5.

Figure 9:
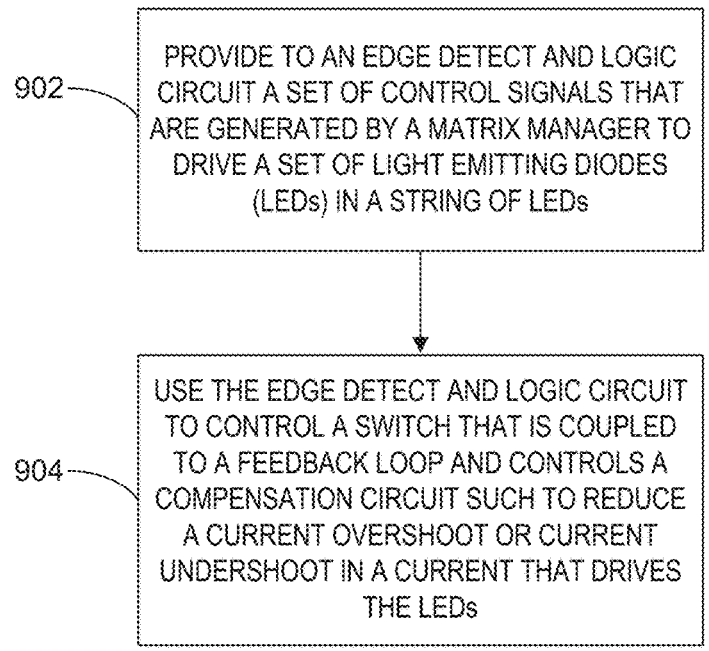
FIG. 9 is a flowchart of an illustrative process for using an edge detect and logic circuit to control a compensation circuit, according to various embodiments of the present disclosure.

FIG. 9 is a flowchart of an illustrative process for using control signals of an edge detect and logic circuit to control a compensation circuit, according to various embodiments of the present disclosure. In embodiments, process 900 may begin at step 902 when a set of control signals that may be generated, e.g., by a matrix manager and that drive a set of LEDs in a string of LEDs is provided to an edge detect and logic circuit. The set of control signals may indicate, e.g., whether which switches that control the LEDs are about to open or close. This information may be used by the edge detect and logic circuit, at step 904, to control a switch, such as switch 238 in FIG. 5, which is coupled to a feedback loop and controls a compensation circuit, to reduce, according to various embodiments presented herein, a current overshoot or current undershoot in a current that drives the LEDs. One skilled in the art shall recognize that: (1) certain steps may optionally be performed; (2) steps may not be limited to the specific order set forth herein; (3) certain steps may be performed in different orders; and (4) certain steps may be done concurrently.

Figure 10:
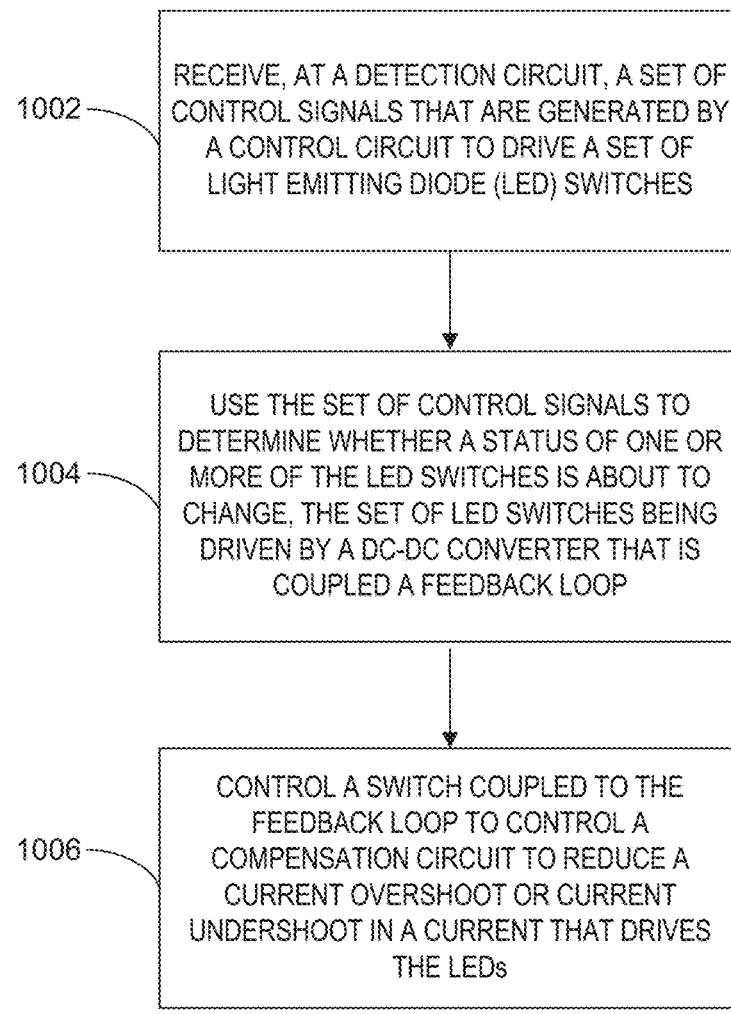
FIG. 10 is a flowchart of an illustrative process for using a detecting circuit to control a compensation circuit, according to various embodiments of the present disclosure.

FIG. 10 is a flowchart of an illustrative process for using a detecting circuit to control a compensation circuit, according to various embodiments of the present disclosure. In embodiments, process 1000 may begin at step 1002 when, a detection circuit, e.g., circuit 502 shown in FIG. 5, is used to receive a set of control signals that may be have been generated by a control circuit, such as matrix manager 504 in FIG. 5, to drive a set of LEDs. At step 1004, the set of control signals, e.g., their rising edge, may be used to determine whether a status of any of the LEDs driven by a DC-DC converter circuit is about to change. The DC-DC converter circuit may comprise a feedback loop. Finally, at step 1006, in response to the determination, a switch that couples, e.g., the detection circuit to the feedback loop, may be used to control a compensation circuit that is also coupled to the feedback loop such as to reduce a current overshoot or current undershoot in a current that drives the LEDs Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also appreciate that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A average current mode control circuit for driving a load with a constant current, the circuit comprising:
   a sensing circuit that in response to sensing a load current generates a sensing signal;
   a first error amplifier coupled receive the sensing signal and output a voltage at a voltage node that is coupled to a second error amplifier;
   a compensation circuit removably coupled to the voltage node via a switch; and
   a detection circuit coupled to the switch and comprising:
      a zero-current detection circuit that, in response to detecting a zero current causes the switch to disconnect the compensation circuit from the voltage node to enable the first error amplifier to provide a first voltage to the second error amplifier, which increases a charging current in a capacitor to reduce a dead time in the load current; and an overcurrent detection circuit that, in response to detecting an overcurrent causes the switch to disconnect the compensation circuit from the voltage node to enable the first error amplifier to provide to the second error amplifier a second voltage to decrease the charging current and reduce an overshoot.

2. The circuit of claim 1, wherein, the second voltage is lower than the first voltage.

3. The circuit of claim 1, wherein the first error amplifier comprises an input to receive a reference voltage that controls the load current when the switch is closed.

4. The circuit of claim 1, further comprising a set of comparators that determine a duty cycle of one or more switches of an H-bridge.

5. The circuit of claim 1, wherein the load current is coupled to a set of light-emitting diodes (LEDs).

6. The circuit of claim 5, wherein the set of LEDs comprises a plurality of LEDs that are coupled in a series configuration.

7. The circuit of claim 1, wherein at least one of the zero-current detection circuit or the overcurrent detection circuit comprises a comparator.

8. The circuit of claim 7, wherein the comparator is coupled to a logic circuit that is coupled to the switch.

9. An average current mode control method for driving a load with a constant current, the method:
   in response to a zero-current detection circuit detecting a zero current condition in a load current, disconnecting a compensation circuit from a first error amplifier to enable the first error amplifier to provide a first voltage to a second error amplifier, which increases a charging current in a capacitor to reduce a dead time in the load current; and
   in response to an overcurrent detection circuit detecting an overcurrent condition in the load current, disconnecting the compensation circuit from the first error amplifier to enable the first error amplifier to provide to the second error amplifier a second voltage to decrease the charging current and reduce an overshoot.

10. The method of claim 9, wherein, the second voltage is lower than the first voltage.

11. The method of claim 9, wherein the first error amplifier, at an input, receives a reference voltage that controls the load current.

12. The method of claim 9, further comprising a set of comparators that determine a duty cycle of one or more switches of an H-bridge.

13. The method of claim 9, wherein the load current is coupled to a set of light-emitting diodes that are coupled in a series configuration.

14. The method of claim 9, wherein at least one of the zero-current detection circuit or the overcurrent detection circuit comprises a comparator.

15. The method of claim 14, wherein the comparator is coupled to a logic circuit that is coupled to a switch.

16. A detection circuit for an average current mode control circuit, the detection circuit comprising:
   a zero-current detection circuit that, in response to detecting a zero current condition causes a switch to disconnect a compensation circuit from a voltage node to enable a first error amplifier to provide a first voltage to a second error amplifier to increase a charging current in a capacitor and reduce a dead time in a load current; and
   an overcurrent detection circuit that, in response to detecting an overcurrent condition causes the switch to disconnect the compensation circuit from the voltage node to enable the first error amplifier to provide to the second error amplifier a second voltage to decrease the charging current and reduce an overshoot.

17. The detection circuit of claim 16, wherein the zero-current detection circuit and the overcurrent detection circuit are removably coupled to the compensation circuit via the switch.

18. The detection circuit of claim 16, further comprising a sensing circuit that in response to sensing the load current generates a sensing signal.

19. The detection circuit of claim 18, wherein the first error amplifier is coupled receive the sensing signal and output a voltage at the voltage node.

20. The detection circuit of claim 18, wherein at least one of the zero-current detection circuit or the overcurrent detection circuit comprises a comparator that is coupled to a logic circuit, which is coupled to the switch.

* * * * *